United States Patent [19]

Cadée

[11] Patent Number: 4,747,266

[45] Date of Patent: May 31, 1988

[54] HYDROMOTOR

[75] Inventor: Theodorus P. M. Cadée, Goirle, Netherlands

[73] Assignee: Volvo Car B.V., Helmond, Netherlands

[21] Appl. No.: 13,765

[22] Filed: Feb. 12, 1987

[30] Foreign Application Priority Data

Feb. 13, 1986 [NL] Netherlands .................. 8600353

[51] Int. Cl.[4] .......................................... F16D 31/00
[52] U.S. Cl. .................................. 60/325; 91/501
[58] Field of Search .......... 192/59; 91/501; 60/325, 60/487, 489

[56] References Cited

U.S. PATENT DOCUMENTS

| 1,462,600 | 7/1923 | Hele-Shaw | 192/59 |
| 1,648,000 | 11/1927 | Lee | 60/465 |
| 1,995,646 | 3/1935 | Paterson | |
| 2,847,938 | 8/1958 | Gondek | 91/483 X |
| 3,030,933 | 4/1962 | Bergstedt | 91/501 |
| 3,664,128 | 5/1972 | Heyl | 60/325 |
| 3,838,574 | 10/1974 | Gelders | 60/325 X |

FOREIGN PATENT DOCUMENTS

| 128658 | 8/1948 | Australia | 91/499 |
| 3040928 | 6/1980 | Fed. Rep. of Germany | |
| 3139191 | 4/1983 | Fed. Rep. of Germany | |
| 508434 | 10/1920 | France | |
| 2101963 | 3/1972 | France | |
| 135799 | 12/1919 | United Kingdom | |
| 935145 | 8/1963 | United Kingdom | |

Primary Examiner—Edward K. Look
Attorney, Agent, or Firm—Pennie & Edmonds

[57] ABSTRACT

Device wherein the co-operation of a rotatable shaft and the displacement of a hydraulic medium forms a variable transmission unit or a pump, said device comprising an ingoing (driving) shaft having a widened part/rotor and an outgoing (driven) shaft co-axial with the ingoing shaft, the widened part of the ingoing shaft being provided with a number of cylindrical bores, substantially parallel to its center line, each bore containing a plunger which can reciprocate in said bore, said outgoing shaft being provided with a plate (mirror plate) obliquely arranged under an angle $\alpha$ with respect to the axis of the shaft for co-operating with protruding end(s) of the plunger(s) such that upon rotation of the rotor or the outgoing shaft the plunger(s) reciprocate in its (their) bores, each bore presenting in its wall a radially directed channel to establish a connection between the bore(s) and a circuit containing a hydraulic medium.

9 Claims, 2 Drawing Sheets

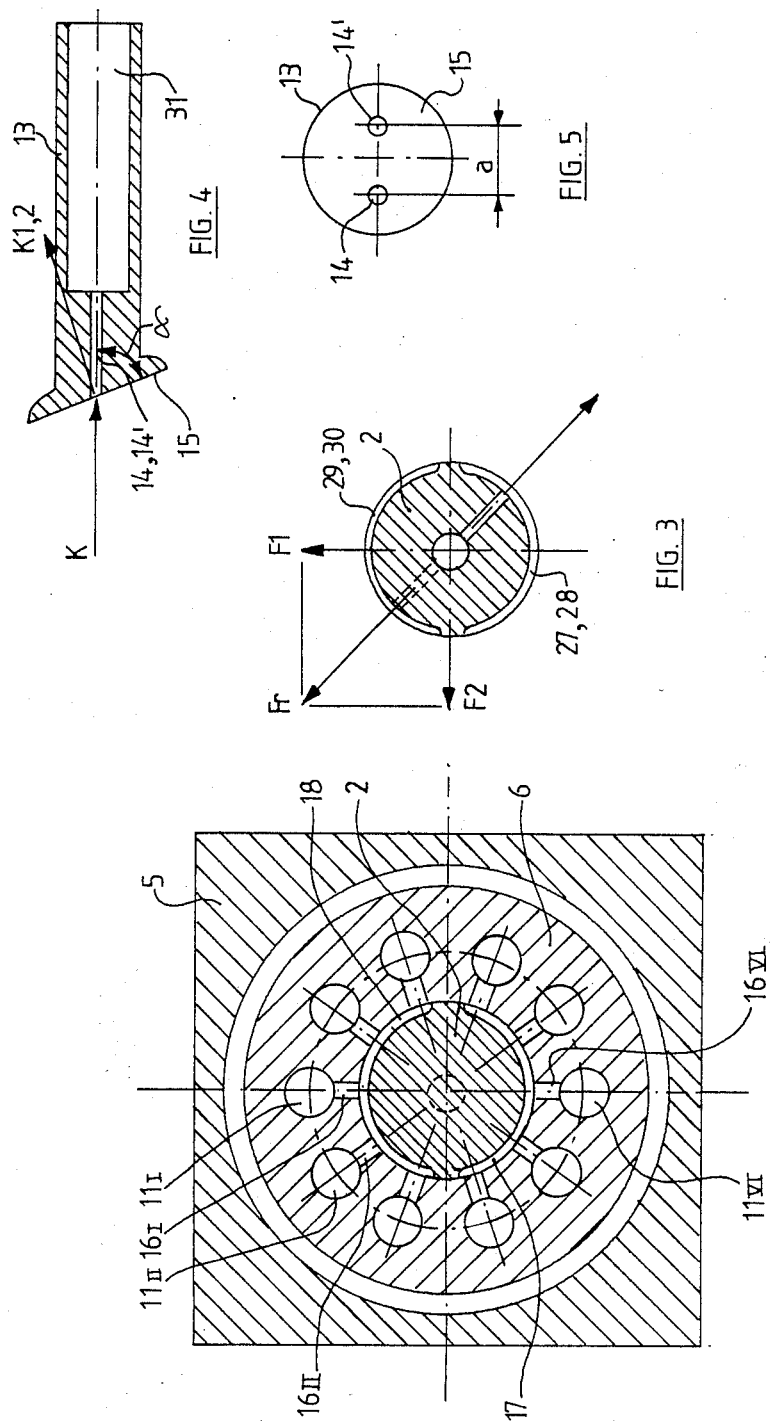

HYDROMOTOR

FIELD OF THE INVENTION

The invention relates to a device wherein the co-operation of a rotatable shaft and the displacement of a hydraulic medium forms a variable transmission unit or a pump. Said device comprises an ingoing (driving) shaft having a widened part (rotor) and an outgoing (driven) shaft co-axial with the ingoing shaft, the widened part of the ingoing shaft being provided with a number of cylindrical bores, substantially parallel to its centre line, each bore containing a plunger which can reciprocate in said bore. According to the present invention, the said plunger(s) have a length such that in all positions thereof one end protrudes outside the bore(s). The outgoing shaft is provided with a plate (mirror plate) obliquely arranged under an angle $\alpha$ with respect to the axis of the shaft for co-operating with the protruding end(s) of the plunger(s) in such manner that upon rotation of the rotor or of the outgoing shaft the plunger(s) reciprocate in its (their) bore(s). Each bore presents in its wall a radially directed channel to establish a connection between the bore(s) and a circuit containing a hydraulic medium.

BACKGROUND OF THE INVENTION

Hydraulic pumps and hydraulically driven shafts (motors) respectively as generally described above are known. The plungers are connected to the oblique plate by means of ball joints. On rotation of the shaft the plunger(s) move to and fro and the passages of the bores to the pressure chambers provide supply and discharge of hydraulic medium to and from the pressure chambers, according to the position of said chambers and therewith the position of the plungers which are determined by the present position of the main shaft.

In principle two identical aggregates, as described hereinabove, may be used as a hydraulic regulating system for converting the number of revolutions/torque of an ingoing shaft into a variable number of revolutions/torque of an outgoing shaft. The ingoing shaft drives a pump as described above. The flowing hydraulic medium drives an identical aggregate which works as a driving aggregate and drives an outgoing shaft. The quantity of medium supplied determines the number of revolutions of the driving shaft; the pressure determines the torque. The two units may be combined to form one aggregate, if desired. Two mirror-symmetric aggregates may be combined into one unit, if desired.

Such a combination has a bad efficiency, especially because of flow losses of the medium. The combination of hydropump and hydromotor is applied amongst others in test-beds for transmission means. Usually they are combined into one unit with a rotatable, adjustable passage for a hydraulic medium.

A similar device is known from the British Pat. No. 135 799. According to this patent there is a second set of cylindrical bores next to a first set in the widened part of the ingoing shaft, substantially parallel to the centre line of this shaft. In the bores of this second set controlling valves are provided which are loaded on one side by a spring and on the other side by the hydraulic medium. Dependent on the displacement of these control valves the plungers can reciprocate freely or not in the corresponding bores. In this way a coupling is established or not between the ingoing and outgoing shaft. This known device serves solely as a coupling between both shafts, which coupling can be disengaged.

OBJECT OF THE INVENTION

The purpose of the present invention is to obtain, building on the principle described above, a compact regulating mechanism for two shafts being in line whereby it is possible, by regulating the quantity and pressure of the hydraulic medium displaced by plungers, to regulate the speed and/or torque to be transferred of the one shaft steplessly relative to the other shaft while achieving a high efficiency combined with a solid efficient and simple construction.

SUMMARY OF THE INVENTION

A device according to the invention is characterized in that the ingoing shaft with its widened part and the outgoing shaft are journalled in a housing, the circuit for the hydraulic medium comprising, adjacent to the bore(s) a high-pressure and a low-pressure chamber diametrically arranged with respect to the centre line of the shafts. The end(s) of each plunger facing a swash plate is provided with a foot plate or guiding plate for contacting the swash plate and is arranged under an angle $\alpha$ with respect to the centre line of the plunger which is equal to the angle of the swash plate.

As according to the aim of the invention it must be possible for the number of revolutions of the ingoing shaft and the outgoing shaft to be different, this means that also the number of revolutions of the rotor with bores and plungers, may be different from that of the outgoing shaft part and, therefore, from the swash plates rotating therewith. It is not possible therefore to connect the plungers moveably to the swash plate with ball joints as is usual according to the known state of the art. Instead the plunger foot drags over the swash plate.

According to the invention therefore the plunger or plungers co-operate with a swash plate in such a manner that their co-operating points can be shifted. This is the reason that the foot of a plunger is provided under a fixed angle $\alpha$ relative to the axis of the plunger, which is equal to the angle $\alpha$ which the relevant swash plate makes with the central axis. With a different number of revolutions the foot of a plunger slides over the swash plate. This generates at the same time a rotating movement of the plunger which aids a good lubrication between plunger and the wall of the bores.

In order to enable also a good lubrication of the inter surface between plunger foot and swash plate each plunger can be provided with at least one narrow bore approximately to its centre line which brings hydraulic medium from the bore to this inter surface.

Preferably however there are two bores at some distance from each other, debouching according to a line perpendicular to the angle of obliquity of the foot in order to stabilize the position of the plunger.

According to a special embodiment of the invention the outgoing shaft is provided with two swash plates on opposite sides of the widened part of the ingoing shaft, each swash plate co-operating with plungers reciprocating in through-going bores in the widened part of the ingoing shaft. These swash plates include, with respect to the centre line of the shaft equal but opposite angles. An advantage of such a construction is that no outward axial forces are exerted on the rotor as they are internally taken up by the plungers which reciprocate in the same bores. Moreover it is easier to make a through-going bore in the rotor than to produce a bore with one closed end.

The high-pressure and the low-pressure chambers are preferably formed as recesses in the exterior wall of the outgoing shaft. The supply and withdrawal of the hydraulic medium can then be effected through a bore in the centre of the outgoing shaft. It is however also possible to arrange the high-pressure and the low-pressure chambers in the interior wall of the housing. In that case the exterior wall of the rotor must closely fit to the interior wall of the housing.

According to a special embodiment of the present invention the plungers are hollow cylinders closed by their footplates at the ends facing a swash plate and are open on the opposite side.

According to a further special embodiment of the present invention the high-pressure chamber and the low-pressure chamber are different in size.

A device according to the invention can operate as a pump when the outgoing shaft rotates more slowly than the ingoing shaft or is even at a standstill. On the other hand the device can act as a motor when the ingoing shaft rotates more slowly than the outgoing shaft. Further a stepless variation of difference in rotational speed of the ingoing and the outgoing shaft is possible by controlling the quantity and pressure of the hydraulic medium supplied.

BRIEF DESCRIPTION OF THE DRAWINGS

The invention will now be elucidated with reference to a drawing which illustrates a special embodiment of a device according to the invention.

The drawing is a diagrammatic composition, in which:

FIG. 2 is a cross-section according to the line A—A in FIG. 1;

FIG. 3 is a cross-section according to the line B—B in FIG. 1;

FIG. 4 is a longitudinal section of a plunger;

FIG. 5 is a plan view of the foot of the plunger.

DESCRIPTION OF THE PREFERRED EMBODIMENT

Figure 1:
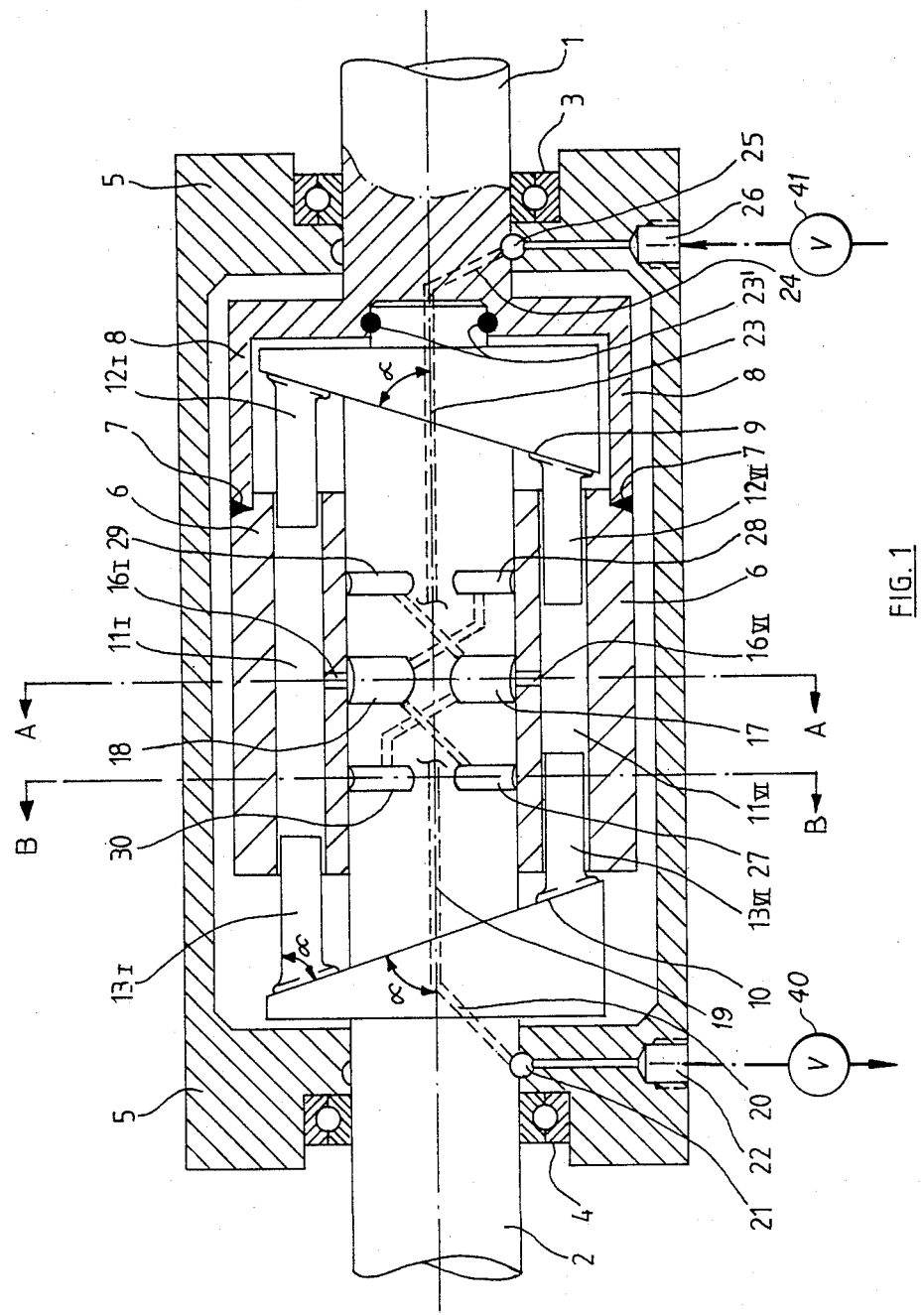
FIG. 1 is a longitudinal section of the device.

An ingoing shaft 1 and an outgoing shaft 2 are carried at 3 and 4 respectively in an at least internally cylindric casing 5. The ingoing shaft 1 has a widened part 6, called "rotor" here, which is coupled to shaft 1 by means of a connection 7 with a projecting part 8 of said shaft.

The outgoing shaft 2 is guided through a bore in the centre of the rotor 6 and has fixed swash plates 9 and 10 at both sides of the rotor 6, which swash plates are positioned at opposite but substantially equal angles α relative to the central axis of the shafts 1 and 2.

In the rotor 6 there are a number of bores 11, which number may vary from 1 to 100, dependent on the size of the device and the conditions to be made. According to the embodiment there are 10; normally the number will vary from 5 to 20.

Each bore has two plungers moving in opposite directions, indicated by reference numbers 12I–12X and 13I–13X respectively.

A plunger, e.g. 13I, is in contact with part of the mirror plate 10, as is illustrated in detail in FIG. 4. Thus narrow channels 14 and 14' (only one of which is visible in the section) run approximately according to the centre line of the plunger and debouch near the edge of the foot 15 of said plunger 13I. This also applies to all other plungers.

As shown in FIG. 2, the bores 11I–11X have in their centres radially directed channels 16I–16X, which are only open towards the centre of the rotor and debouch, corresponding to the position of the rotor 6 (and of shaft 1, therefore), into one of a high-pressure chamber 17 or a low-pressure chamber 18, which are formed by recesses in the shaft of the outgoing shaft 2 which is located in the centre of the rotor 6. The high-pressure chamber 17 is connected to a fixed connection 22 via channels 19 and 20 and an annular groove 21 in the casing 5. Corresponding connections between the chamber 17 and 18 respectively with the channels 19 and 23 respectively are not illustrated. Likewise the low-pressure chamber 18 is connected to a fixed intake 26 via channels 23 in the outgoing shaft 2, a connecting channel 24 in the ingoing shaft 1 and an annular groove 25 in the casing 5. 23' Illustrates a sealing ring, whether or not with bearing, of the trunnion of the outgoing shaft 2. The chambers 17 and 18 are otherwise not completely uniform. The overlap of the channels 16I–16X by the partition between the chambers 17 and 18 is asymmetric in order to effect pressure-relief for opening the low-pressure chamber by means of an extra expansion after shutting off the inlet.

The operation of the device now amounts to this that when the outgoing shaft 2 is stationary and the ingoing shaft 1 and the rotor 6, therefore, rotate in a certain direction, the plungers 12I–12X and 13I–13X move to and fro in opposite directions. Via the bores 16I and 16II, chamber 17, the channels 19 and 20 and annular groove 21 a medium is pumped to the fixed outlet 22. The medium is supplied via the fixed low-pressure intake 26, the annular groove 25, the channels 24 and 23 to the low-pressure chamber 18 and from this chamber through the bores 16I–16X to the chambers 11I–11X between the plungers 12I–12X and 13I–13X respectively.

It will be apparent that the whole, as already indicated above, works as a pump. However, this applies insofar as the outgoing shaft 2 does not rotate, which was assumed in this preamble. When now as an extreme regulating position the supply and discharge or only the discharge of the medium via the connections 22 and 26 is blocked, the medium between the plungers will behave as an undistortable mass and it will not be possible for the plungers 12 and 13 respectively to move to and fro. The swash plates 9 and 10 are taken along and the outgoing shaft 2 rotates along with the ingoing shaft 1, as if forming one entity. The efficiency of the transmission is, therefore, substantially 100% in this case. This in contrast to the usual constructions, whereby it is precisely a maximum flow of medium which is required for a maximum number of revolutions of the outgoing shaft.

Between the two situations described hereinabove all kinds of variants may be effected and employing values 40, 44 (FIG. 1) to regulate the quantity and/or the pressure of the hydraulic medium moving between the connections 22 and 26. This amounts to influencing the speed of movement and/or torque capacity of the plungers 12 and 13 on the swash plates 9 and 10, i.e. the quantity of flow permitted with respect to a given rate of rotation of the input shaft 1 determines the difference in rate of revolution of shafts 1 and 2, and accordingly the transfer of torque.

It is even possible to supply extra energy by way of an extra quantity of medium under pressure, or the reverse, viz. discharging energy. When energy is supplied the swash plates 9 and 10 must be positioned sufficiently oblique relative to the shaft, in other words angle α must be relatively small.

Because the plungers, due to the oblique position of their feet relative to the mirror plates, exert an upward force F1 as shown in FIG. 3 on the rotor 6 and simultaneously the medium exerts a transverse force F2 under the high pressure from chamber 17 and bores 16 in the chamber between the plungers it is necessary to compensate the resultant Fr of said two forces in order to diminish the friction between the ingoing and outgoing shafts. This can be realized in a simple manner by providing recesses (compensation grooves) 27, 28 and 29, 30 respectively in the part of the shaft 2 inside the rotor 6, as FIGS. 1 and 3 show. The recesses 27 and 28 are the low-pressure chambers; the recesses 29, 30 have high pressure. Said grooves are therefore connected to the high-pressure part 17, 19-22 and the low-pressure part 18, 23-26 respectively. The connecting channels are only partly visible in the figures. It stands to reason that the correct position of said chambers is determined by details of the construction which determine the resultant force(s).

FIG. 4 illustrates a longitudinal section of one of the plungers 12I-12X or 13I-13X. Preferably the plunger is hollow in order to keep the mass small. The foot 15 has a plane, oblique at an angle α relative to the plane perpendicular to the centre line. Angle α corresponds with the angle α which each of the mirror plates 9 or 10 makes with their axis of rotation. The plan view of figure 5 shows that there are two bores 14 and 14' in the foot (in the section of FIG. 4 only one bore is visible), which bring lubricating fluid from the plunger chambers 31 to their guiding surface of the mirror plates 9 and 10. Acting on the plunger are a mechanical force K, the fluid pressure and the forces K1 and K2 of the fluid pressure via the bores 14 and 14' at a distance a from each other. The forces keep one another in balance, such that the foot 15 bears against the relevant swash plate. If, for whatever reason, the plunger assumes a position out of alignment there will be K1≠K2, effecting a reversing torque on the plunger, which will put the plunger in the correct position again. In FIG. 4 K1 and K2 viz. are on the plane of the drawing and act at the distance a from each other, are equal (when the position is not out of alignment) and have the same direction.

It may be advantageous that the angle of one of the swash plates 9 and 10 be made rotatably adjustable relative to the shaft 2 in order to influence the length of stroke of the plungers and therewith the characteristic of the device.

For a device according to the invention there are many applications, such as:
  torque regulation in high speed shafts;
  torque distribution with gear drives in front and rear wheel drives of vehicles;
  phase control of shafts;
  steering of caterpillar vehicles;
  variable locking differential;
  torque sensor by means of pressure measurement for high speed shafts;
  enlargement of the driving away torque by increase of the supply of medium;
  use of excess hydraulically available energy;
  regulating and driving unit in test-beds;
  a combination of two or more of the above possibilities.

The first three applications are of importance for test-beds for transmission mechanisms.

For a good operation and regulation of the device regulating means are required outside the device, a.o. comprising valves, throttle valves, an accumulator, a reservoir and the like. As a rule the hydraulic medium will be an oil suitable for the purpose.

What is claimed is:

1. A swash plate device for use as a variable transmission, said device comprising an ingoing driving shaft comprising a widened rotor and an outgoing driven shaft coaxial with the ingoing shaft, the ingoing shaft and the outgoing shaft being journalled in a housing, the widened part of the ingoing shaft being provided with a plurality of cylindrical bores substantially parallel to its center line, each bore containing a plunger for reciprocation in said bore, at least one end of each plunger having a flat foot face at an angle α to the axis of the plunger protruding outside its bore, said outgoing shaft being provided with a swash plate having a planar face obliquely arranged at an angle α with respect to the axis of the shaft for contacting the protruding flat foot faces of the plungers, so that upon rotation of the rotor with respect to the outgoing shaft the plungers reciprocate in the bores, and
  wherein each bore has a radially directed channel formed in its wall to establish a connection between the bores including a circuit containing a hydraulic medium, said circuit comprising a high-pressure chamber and a low-pressure chamber adjacent to the bore and diametrically arranged with respect to the center line of the shafts, the housing and shafts being provided with passages for said medium embouching in each of the chambers.

2. A device according to claim 1, characterized in that the high-pressure and low-pressure chambers for the hydraulic medium are formed as recesses in the exterior wall of the outgoing shaft.

3. A device according to claim 1, characterized in that the outgoing shaft is provided with a further swash plate having a face inclined at an angle α to the axis of the shafts, engaging a second set of plungers disposed in said bores, said second swash plate being located such that said swash plates are positioned on opposite sides of the widened part of the ingoing shaft, and the swash plates are arranged at equal but opposite angles α to the center line of the shafts.

4. A device according to claim 3, characterized in that each plunger is formed as a hollow cylinder with two opposite ends, one end of the cylinder being closed by the foot while the opposite end of the cylinder is open.

5. A device according to claim 4, characterized in that each plunger has at least one bore formed therein and extending from the foot thereof to the interior of the bore in which the plunger reciprocates.

6. A device according to claim 5, characterized in that two bores are provided in each plunger on opposite sides of the center line of the plunger.

7. A device according to claim 1, characterized in that the high-pressure chamber and the low-pressure chamber are different in size.

8. A device according to claim 2, wherein compensation grooves are provided in the exterior wall of the outgoing shaft on opposite sides of the pressure chambers, at least two cooperating grooves being connected to the high-pressure side of the device and located such that an inequality of forces due to the hydraulic pressure is compensated.

9. A device according to any one of claims 1-8, in combination with means for regulating the flow of hydraulic fluid through said device.

* * * * *